July 22, 1947.　　　　G. G. MEYER　　　　2,424,362
ANIMAL TRAP
Filed Aug. 30, 1943
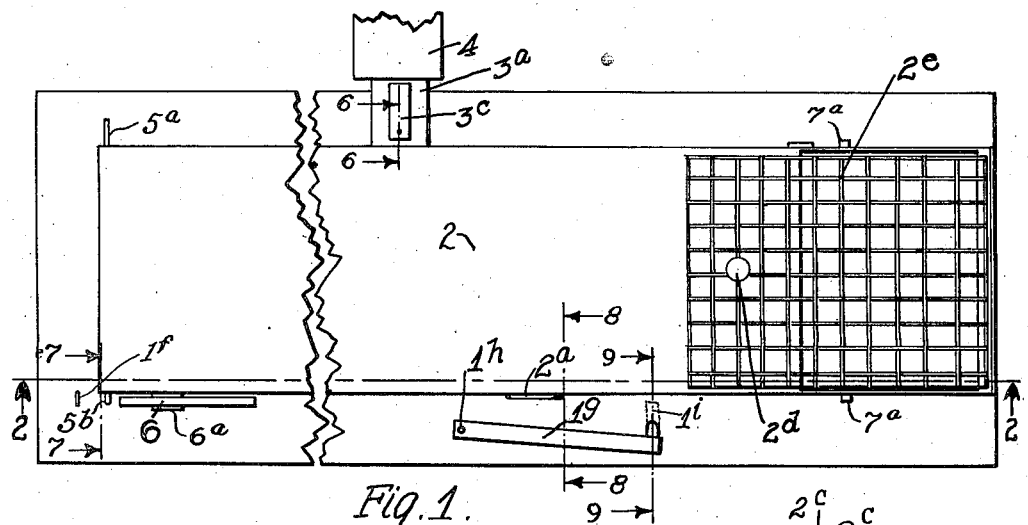
Fig. 1.
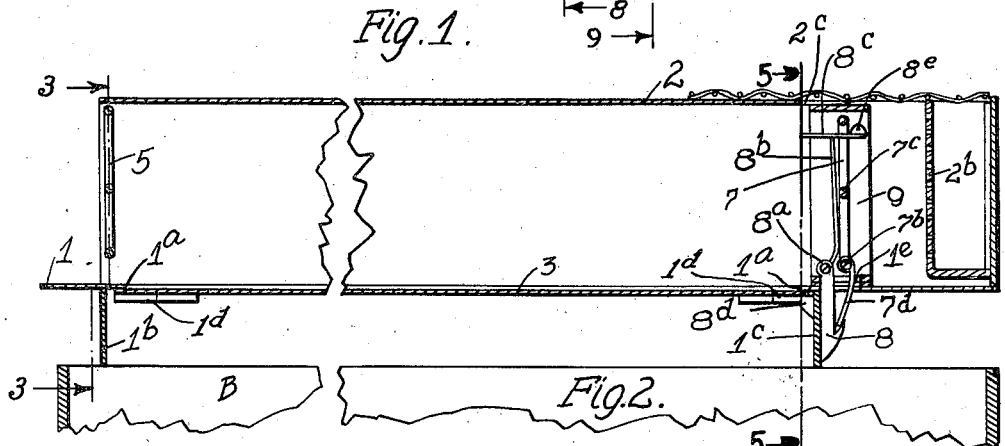
Fig. 2.
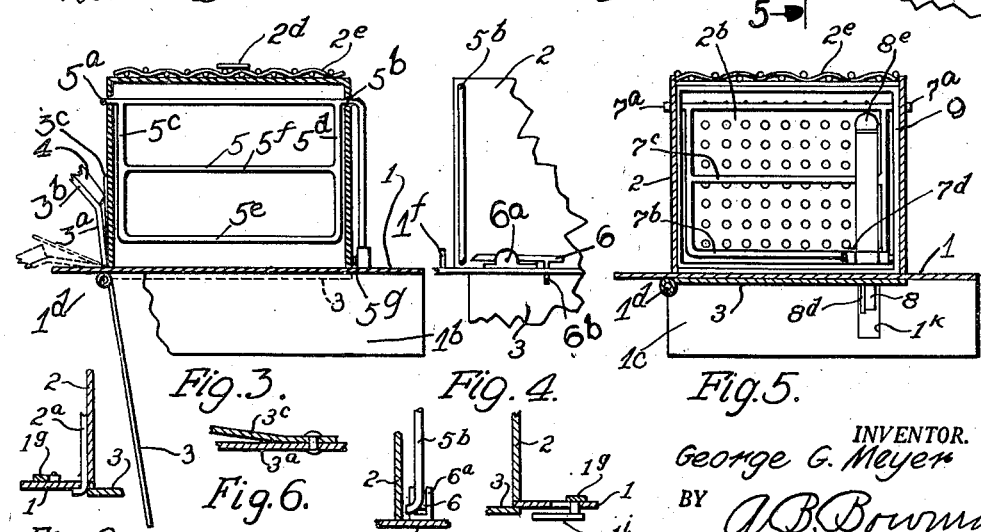
Fig. 3.　　Fig. 4.　　Fig. 5.
Fig. 6.　　Fig. 7.　　Fig. 9.
Fig. 8.
INVENTOR.
George G. Meyer
BY A. B. Bowman
Attorney Patented July 22, 1947

2,424,362

UNITED STATES PATENT OFFICE 2,424,362

ANIMAL TRAP

George G. Meyer, Potrero, Calif.

Application August 30, 1943, Serial No. 500,462

10 Claims. (Cl. 43—70)

My invention relates to an animal trap, more particularly adapted for catching rats, squirrels, or the like and more particularly of the trap door type which drops the animal into a box or receptacle below by the weight of the animal operating the trap and the objects of my invention are:

First, to provide an animal trap of this class which is applicable for use for various types of animals;

Second, to provide a trap of this class in which the entrance gate is latched to prevent the animal getting out without being caught in the trap;

Third, to provide a trap of this class in which part of the bait is so arranged that the animal does not reach the bait;

Fourth, to provide a trap of this class in which provision is made for light at the end of the trap where the bait is located;

Fifth, to provide a trap of this class in which a large number of animals may be caught one after the other;

Sixth, to provide a trap of this class in which bait and the trap door support are separate from the casing;

Seventh, to provide a trap of this class with provisions made for operation from two positions of the bait;

Eighth, to provide a trap of this class in which it is difficult for the animal to escape after it has once entered the trap casing;

Ninth, to provide a trap of this class which is simple and economical of construction, easy to operate, efficient in operation, reliable and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a fragmentary top or plan view of my trap; Fig. 2 is a fragmentary sectional view taken from the line 2—2 of Fig. 1; Fig. 3 is a sectional view of my trap taken on the line 3—3 of Fig. 2 showing a part in elevation to facilitate the illustration showing portions fragmentarily and showing the trap door in varying positions by solid and dash lines and only the forward portion of the interior of the trap; Fig. 4 is a fragmentary side elevational view of the front portion; Fig. 5 a sectional view taken from the line 5—5 of Fig. 2; Figure 6 is an enlarged fragmentary sectional view taken from the line 6—6 of Fig. 1; Fig. 7 is an enlarged fragmentary sectional view taken from the line 7—7 of Fig. 1; Fig. 8 is an enlarged fragmentary sectional view taken from the line 8—8 of Fig. 1; and Fig. 9 is an enlarged fragmentary sectional view taken from the line 9—9 of Fig. 1, showing portions in elevation to facilitate the illustration.

Similar characters of reference refer to similar parts and portions throughout the several views of the drawings.

The base 1, casing 2, trap door 3, counterweight 4, entrance gate 5, entrance gate latch 6, bait gate 7, trap door latch 8 and latch support 9 constitute the principal parts of my animal trap.

The base 1 is preferably of rectangular shape as shown and is provided with a rectangularly shaped opening 1a over which the casing 2 is mounted and against the lower side of which the door 3 is arranged to rest. It is provided with two downwardly extending supports 1b and 1c secured to the lower side of the base and adapted to rest upon any receptacle or box B arranged to receive the animals from the trap, as shown best in Fig. 2 of the drawings.

The lower side of the base 1 at one side is provided with hinges 1d which form pivotal supports for the door 3, as shown best in Fig. 3 of the drawings. This door 3 is a flat plate member and is arranged to fit over the lower side of the opening 1a and overlap the same, as shown by dash line in Fig. 3 of the drawings. This door is provided at its upper side with an extended portion 3a which is provided with an angular portion 3b. On this angular portion 3b is secured the counterweight 4 which is sufficient weight to close the door 3. Secured at its one end to the member 3a is a leaf spring 3c which extends upwardly and is arranged to engage the side of the casing 2 when the door is open as shown in Fig. 3 to urge the door to close.

Secured to the base 1 just back of the back side of the door 3 is a latch support 9 which extends upwardly in rectangular form, as shown best in Figs. 2 and 5 of the drawings. Pivotally supported in the upper opposite sides of the support 9 is the gate 7 by means of extended portions 7a which gate is provided with a downwardly extending U-shaped portion 7b and a cross bar 7c, as shown best in Fig. 5 of the drawings. Rigidly mounted on the bar 7b at one side is a downwardly extending latch member 7d which extends downwardly through a slot 1e in the base member 1. Also pivotally mounted on the base member 1 is a hinge 8a which supports the latch member 8 which is in the form of a hook-like member in the lower end of which the latch member 7d is mounted, as shown best in Fig. 2 of the drawings.

Secured to and extending upwardly from the hinge member 8a is a bait support 8b on the upper end of which is a shelf member 8c to the front side of which the bait is secured by tying or otherwise. It will be here noted that the latch member 8, bait support 8b, shelf 8c and lug 8d all swing as a unit about the axis of the hinge 8a.

Mounted over the support 9 at one end and positioned so as to fit around the opening 1a and secured by downwardly extending spring latches 2a with offset ends arranged to fit under the edge of the member 1 is the casing 2 which is open at its lower and front sides. Secured in the back side of this casing considerably back of the support 9 is the bait receptacle 2b which is perforated at its front side. The back upper side of said casing 2 is open at 2c. Pivotally mounted on the casing 2 by means of a frictional pivot support 2d in the form of a loose fitting rivet is a foraminous gate 2e which is adapted to cover the opening 2c and thus provide light at the back side of the casing 2 over the bait receptacle 2b and this gate is hinged by pivot support 2d to provide ready accessibility to the bait receptacle 2b.

Pivotally supported near the upper side of the front opening of the casing 2 is the entrance gate 5 which is composed of open bars and supported by means of extended portions 5a and 5b extending through holes in the front upper portion of the casing, as shown best in Fig. 3 of the drawings. The gate consists of side bars 5c and 5d, the lower bar 5e and central bar 5f. The portion 5b is extended outwardly and then downwardly to near the base 1 and at the lower end is provided a right angled inwardly turned portion 5g to provide a broad end which is mounted between a stop member 1f on the base member 1 and the front end of a latch member 6 as shown best in Fig. 4 of the drawings. This latch member 6 is pivotally supported by means of a journal member 6a secured to the base 1 and this latch member 6 is provided with a downwardly extending portion 6b which is adapted to be engaged by the extended side edge of the door 3 when it is up as shown by the dash lines in Fig. 3 of the drawings for lowering the front end of the latch member to permit the lower end 5g to be carried over the latch member 6 when the animal presses the gate 5 inwardly in entering the trap.

In case it is desired to use the trap for a single animal without using the trap door, there is provided a lever member 1g pivotally mounted at 1h provided with a downwardly and sidewise extending portion 1i which is adapted to fit under the door and hold it from lowering from the weight of the animal.

The operation of my trap is substantially as follows:

The bait receptacle 2b is provided with bait, by turning the gate 2e on the pivot member 2d sidewise and placing the bait in the receptacle 2b, after which the gate 2e is positioned over the opening 2c, as shown in Fig. 1 of the drawings. At the same time bait is placed on and tied to the portion 8c of the member 8. The animal enters the front portion by pressing the gate 5 backwardly and enters toward the bait receptacle 2b lighted through the gate 2e. The animal walks backwardly in the casing 2 on the trap door 3. If it grabs the bait on the portion 8c and pulls on it, the latch member 8 will be moved backwardly at its lower side so that the lug portion 8d extending through the opening 1k in the support 1c clears the door 3, whereupon the weight of the animal will cause the door 3 to drop carrying the counterweights upwardly, all as shown by solid lines in Fig. 3 of the drawings and the animal drops into the receptacle or box B. If, however, the animal does not take hold of the bait 8c, but attempts to go to the bait receptacle 2b, it will engage the gate bars 7b or 7c whereupon the gate will be forced backwardly at its lower side carrying with it the latch member 7d and the member 8 causing the lug 8d to clear the door 3 and the weight of the animal will force the door downwardly. As soon as the animal has dropped from the door into the receptacle below, the counterweight 4 urged by the spring 3c will draw the door 3 into closed position, as shown by dash line in Fig. 3 of the drawings, at the same time engaging the portion 6b of the latch 6 which raises the back end of said latch and lowers the front end thereof clearing the member 5g so that the gate 5 is free to swing inwardly and the trap is ready for another operation.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In an animal trap of the class described, the combination of a substantially rectangularly shaped base member provided with an opening therein extending from near one end thereof to near the opposite end thereof, a trap door hinged to the lower side of said base and arranged to close said opening at its lower side, a counterweight mounted on said door near the hinge side and extending over one side of said base, a casing member arranged to be latched over said opening provided with an open lower side and open end, a gate pivotally mounted at its upper side in the open end of said casing, a latch pivotally mounted on said base provided with a lug arranged to engage said door when up and hold the same, bait supporting means in operative relation with said latch and a bait receptacle backwardly of said bait supporting means.

2. In an animal trap of the class described, the combination of a substantially rectangularly shaped base member provided with an opening therein extending from near one end thereof to near the opposite end thereof, a trap door hinged to the lower side of said base and arranged to close said opening at its lower side, a counterweight mounted on said door near the hinged side and extending over one side of said base, a casing member arranged to be latched over said opening provided with an open lower side and open end, a gate pivotally mounted at its upper side in the open end of said casing, a latch pivotally mounted on said base provided with a lug arranged to engage said door when up and hold the same, bait supporting means in operative relation with said latch, said counterweight being provided with a spring to urge the closing of said door.

3. In an animal trap of the class described, the combination of a substantially rectangular shaped base member provided with an opening therein extending from near one end thereof to near the opposite end thereof, a trap door hinged to the lower side of said base and arranged to close said opening at its lower side, a counterweight mounted on said door near the hinge side and extending over one side of said base, a casing member arranged to be latched over said opening provided with an open lower side and open end, a gate pivotally mounted at its upper side in the open end of said casing, a latch pivotally mounted on said base provided with a lug arranged to engage said door when up and hold the same, bait supporting means in operative relation with said latch and a bait receptacle backwardly of said bait supporting means, and stop means on said base arranged to prevent the forward pivoting of said entrance gate.

4. In an animal trap of the class described, the combination of a substantially rectangular shaped base member provided with an opening therein extending from near one end thereof to near the opposite end thereof, a trap door hinged to the lower side of said base and arranged to close said opening at its lower side, a counterweight mounted on said door near the hinge side and extending over one side of said base, a casing member arranged to be latched over said opening provided with an open lower side and open end, a gate pivotally mounted at its upper side in the open end of said casing, a latch pivotally mounted on said base provided with a lug arranged to engage said door when up and hold the same, bait supporting means in operative relation with said latch and a bait receptacle backwardly of said bait supporting means, stop means on said base arranged to prevent the forward pivoting of said entrance gate, and latch means on said base backwardly of said entrance gate operable by the door when closed to release said entrance gate.

5. In an animal trap of the class described, the combination of a substantially rectangular shaped base member provided with an opening therein extending from near one end thereof to near the opposite end thereof, a trap door hinged to the lower side of said base and arranged to close said opening at its lower side, a counterweight mounted on said door near the hinge side and extending over one side of said base, a casing member arranged to be latched over said opening provided with an open lower side and open end, a gate pivotally mounted at its upper side in the open end of said casing, a latch pivotally mounted on said base provided with a lug arranged to engage said door when up and hold the same, bait supporting means in operative relation with said latch, stop means on said base arranged to prevent the forward pivoting of said entrance gate, latch means on said base backwardly of said entrance gate operable by the door when closed to release said entrance gate, and a bait receptacle in the back of said casing backwardly of said trap door and latch.

6. In an animal trap of the class described, the combination of a substantially rectangular shaped base member provided with an opening therein extending from near one end thereof to near the opposite end thereof, a trap door hinged to the lower side of said base and arranged to close said opening at its lower side, a counterweight mounted on said door near the hinge side and extending over one side of said base, a casing member arranged to be latched over said opening provided with an open lower side and open end, a gate pivotally mounted at its upper side in the open end of said casing, a latch pivotally mounted on said base provided with a lug arranged to engage said door when up and hold the same, bait supporting means in operative relation with said latch, stop means on said base arranged to prevent the forward pivoting of said entrance gate, latch means on said base backwardly of said entrance gate operable by the door when closed to release said entrance gate, a bait receptacle in the back of said casing backwardly of said trap door and latch, and a foraminous gate pivotally mounted on said casing at the back side and forming the back upper surface of said casing when closed.

7. In an animal trap of the class described, the combination of a substantially rectangular shaped base member provided with an opening therein extending from near one end thereof to near the opposite end thereof, a trap door hinged to the lower side of said base and arranged to close said opening at its lower side, a counterweight mounted on said door near the hinge side and extending over one side of said base, a casing member arranged to be latched over said opening provided with an open lower side and open end, a gate pivotally mounted at its upper side in the open end of said casing, a bait receptacle in the opposite end of said casing, a latch pivotally mounted on said base provided with a lug arranged to engage said door when up and hold the same, bait supporting means in operative relation with said latch, a gate pivotally mounted at its upper side in said casing backwardly of said trap door and latch means in connection with said gate to release said trap door.

8. In an animal trap of the class described, the combination of a substantially rectangular shaped base member provided with an opening therein extending from near one end thereof to near the opposite end thereof, a trap door hinged to the lower side of said base and arranged to close said opening at its lower side, a counterweight mounted on said door near the hinge side and extending over one side of said base, a casing member arranged to be latched over said opening provided with an open lower side and open end, a gate pivotally mounted at its upper side in the open end of said casing, a bait receptacle in the opposite end of said casing, a latch pivotally mounted on said base provided with a lug arranged to engage said door when up and hold the same, bait supporting means in operative relation with said latch, and latch means pivotally mounted on said base and arranged to engage said trap door for holding said trap door closed.

9. In an animal trap of the class described, the combination of a substantially rectangular shaped base member provided with an opening therein extending from near one end thereof to near the opposite end thereof, a trap door hinged to the lower side of said base and arranged to close said opening at its lower side, a counterweight mounted on said door near the hinge side and extending over one side of said base, a casing member arranged to be latched over said opening provided with an open lower side and open end, a gate pivotally mounted at its upper side in the open end of said casing, a bait receptacle in the opposite end of said casing, a latch pivotally mounted on said base provided with a lug arranged to engage said door when up and hold the same, bait supporting means in operative relation with said latch, and spring means in connection with said counterweight arranged to engage said casing to facilitate the starting of movement and the closing of the trap door.

10. In an animal trap of the class described, the combination of a casing adapted to receive an animal, a gate member pivotally mounted near its upper side in the front end of said casing member and provided with an outwardly extending portion extending downwardly to near the base and provided with a right angled turn at its lower end, a stop arranged to engage one side of said downwardly extending portion and a latch arranged to engage and release the opposite side thereof.

GEORGE G. MEYER.

REFERENCES CITED

The following references are of record in the file of this patent:

UNITED STATES PATENTS

| Number | Name | Date |
|---|---|---|
| 2,163,577 | Allen | June 27, 1939 |
| 2,178,789 | Heath | Nov. 7, 1939 |
| 1,079,944 | McClenahan | Dec. 2, 1913 |
| 70,134 | Trevitt | Oct. 22, 1867 |
| 2,108,287 | Kellum | Feb. 15, 1938 |
| 1,463,874 | Croyle | Aug. 7, 1923 |
| 1,193,320 | Walker et al. | Aug. 1, 1916 |